April 25, 1961  S. SUOZZO  2,981,952
TELEVISION BRIGHTENER
Filed Nov. 12, 1957
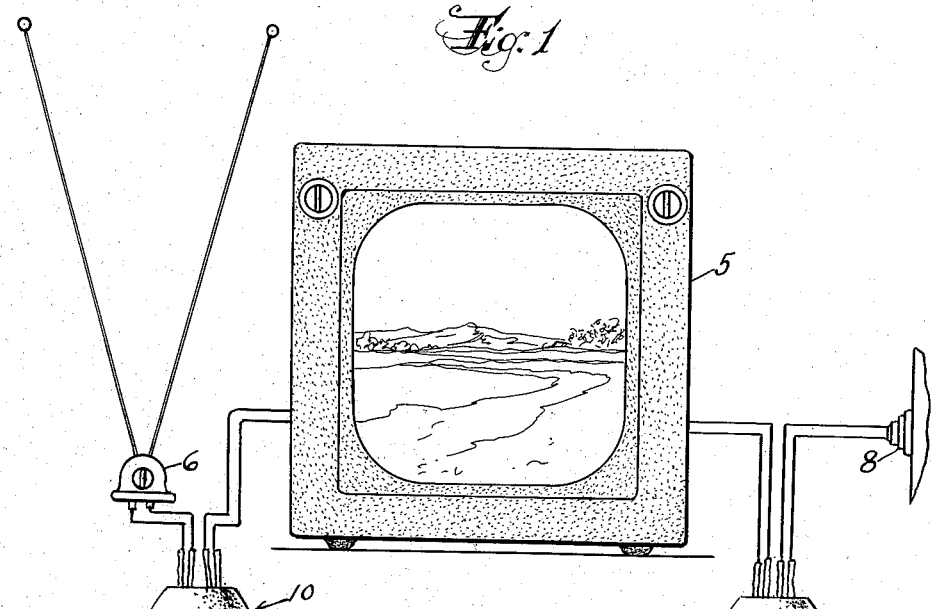
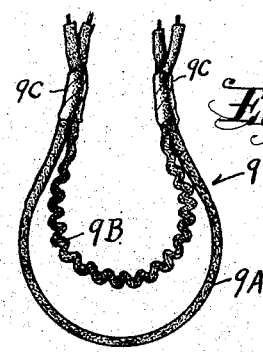
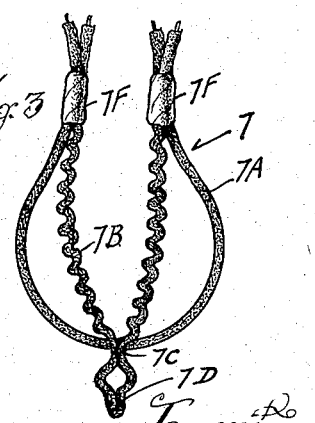
Inventor:
Salvador Suozzo
By Roy Griffith Jones
Attorney

United States Patent Office 2,981,952
Patented Apr. 25, 1961

2,981,952

TELEVISION BRIGHTENER

Salvador Suozzo, 386 N. 6th St., Newark, N.J.

Filed Nov. 12, 1957, Ser. No. 695,983

1 Claim. (Cl. 343—820)

This invention relates to accessories or attachments to television receivers.

The usefulness of my invention resides in the fact that it makes the received picture brighter, clearer and more distinct, as demonstrated by use.

The drawings illustrate the invention, and in these:

Fig. 1 is a front elevational view of a television receiver and antenna with the devices of my invention shown connected to the antenna and the receiver and to the power source and the receiver;

Fig. 2 shows one of the devices, being the one shown in Fig. 1 as connected to the power source and the receiver;

Fig. 3 shows another one of the devices, being the one shown in Fig. 1 as connected to the antenna and the receiver; and Fig. 4 shows fragmentarily a variation of Fig. 3.

Referring to the drawings for a more detailed description, the numeral 5 indicates a television receiver connected to an antenna 6 through coil 7, shown in Fig. 3, and to a power source 8 through coil 9, shown in Fig. 2.

Coil 7, as shown in Fig. 3, comprises a loop 7A of insulated wire and a loop 7B of crimped insulated wire within loop 7A. Loop 7B is pinched at 7C to form a sub-loop 7D extending below loop 7A, and may be tied at 7C by a tape 7E as shown in Fig. 4, if desired. Loops 7A and 7B are taped together near their ends, as shown at 7F of Fig. 3. Loop 7A is approximately 22 inches long from end to end and loop 7B is about 19 inches from end to end, including the sub-loop 7D, which is one inch long, measured from the point 7C to its tip.

Coil 9, shown in Fig. 2, comprises a loop 9A of insulated wire and an inner loop 9B of crimped insulated wire, the two loops being taped together at 9C near their ends.

The coils 7 and 9 are each placed in a casing, as shown in Fig. 1. The casing shown is designated by the numeral 10 and may be made of synthetic plastic material, and comprises a main portion 10A, which is open at the top to allow the end portions of the mentioned coils to extend therethrough. The casing also comprises a removable bottom 10B, the coils being placed in the casing after removing the bottom. The coils are desirably held in place within their respective casings; this may be done in any suitable manner, as for example, by pouring a plastic material therein, which material subsequently hardens, as plaster of Paris.

Coil 7 is inserted into the line connecting the antenna 6 and the television receiver, the loop 7A being connected to one side of the line and the loop 7B to the other side of the line, as shown in Fig. 1. Coil 9 is inserted into the line connecting the receiver to the electric power supply 8, loop 9A being connected into one side of the line and loop 9B into the other side. In use, the casings 10, with their contained coils, are placed behind the receiver, so as to be out of sight. The casings shown are, relatively, much larger than the actual size. The actual dimensions are about 2.5 inches high and 1.5 inches diameter at the base.

What is claimed is:

The combination of a television receiver, an antenna, a transmission line connecting the antena to the receiver, a single loop of crimped wire connected to one side of the line and a loop of plain wire connected to the other side of the line, said loop of crimped wire being pinched substantially at its middle to form a sub-loop, the loop of crimped wire being substantially within the loop of plain wire, with said sub-loop being outside of the same.

References Cited in the file of this patent

UNITED STATES PATENTS

| | | |
|---|---|---|
| 1,719,087 | Seymore | July 2, 1929 |
| 1,970,986 | Tamol | Aug. 21, 1934 |
| 2,172,923 | Clay | Sept. 12, 1939 |
| 2,546,322 | Smith | Mar. 27, 1951 |
| 2,628,312 | Peterson et al. | Feb. 10, 1953 |

FOREIGN PATENTS

| | | |
|---|---|---|
| 344,543 | Great Britain | Mar. 12, 1931 |